Nov. 7, 1950        B. H. SHOOPMAN        2,529,426
WIPER CORD FASTENER FOR STEPPING SWITCHES
Filed Nov. 1, 1947
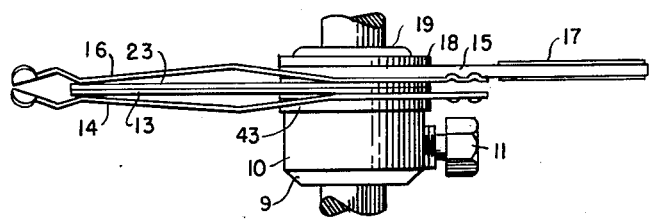
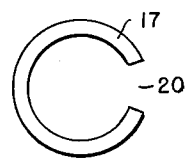
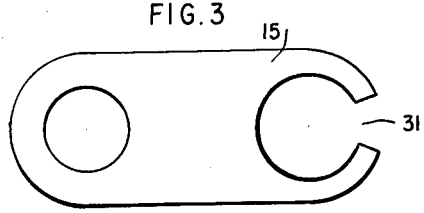
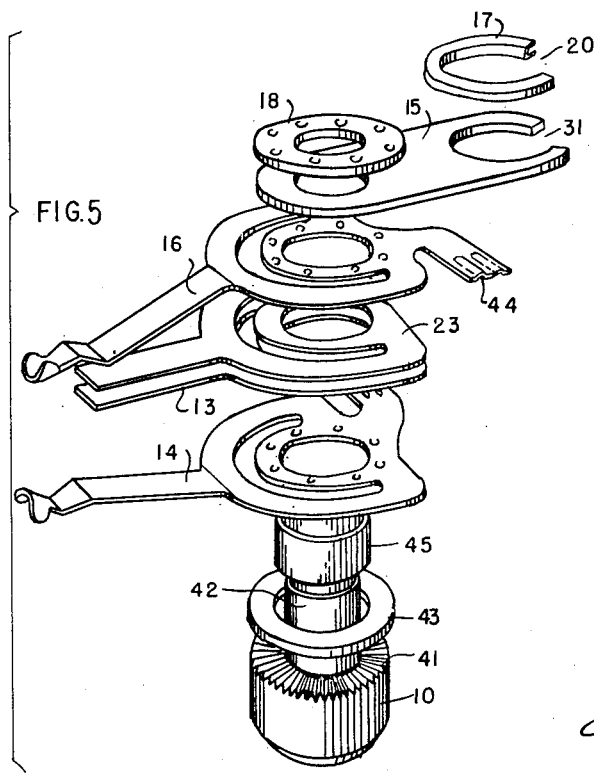
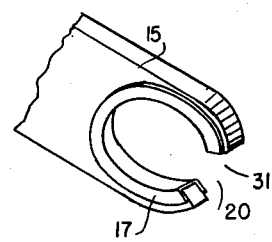
*INVENTOR.*
BERTRAM H. SHOOPMAN
BY
ATTTORNEY Patented Nov. 7, 1950

2,529,426

UNITED STATES PATENT OFFICE 2,529,426

WIPER CORD FASTENER FOR STEPPING SWITCHES

Bertram H. Shoopman, Baytown, Tex., assignor to Automatic Electric Laboratories, Inc., Chicago, Ill., a corporation of Delaware Application November 1, 1947, Serial No. 783,566

3 Claims. (Cl. 179—27.52)

The present invention relates in general to wiper cord retaining means in switch wiper assemblies for automatic stepping switches and more particularly to improved means for retaining the wiper cords which are attached to the wipers in the wiper assemblies of the switches.

The principal object of the invention is the provision of an improved wiper cord guide, or cord holder, on a wiper assembly of a switch which permits easy assembling and replacements of the wiper cords without the necessity of threading the ends of the wiper cords through the guide holes in the cord holders of the wiper assemblies.

Heretofore in automatic stepping switches used in establishing telephone connections, wiper assemblies were secured to the switch shaft and each assembly was provided with a wiper cord guide comprising an elongated insulating member secured in the wiper assembly at one end and provided with an enlarged eyelet, or hole, at the other end through which the wiper cords were first threaded before completing the connections to the wipers. In accordance with the present invention a somewhat similar insulating member is used having, however, an opening cut through the insulating member to the hole therein and a ring of metal is slidably mounted within the hole, such ring also having an opening corresponding to the opening in the insulating member so that when both openings are aligned the wiper cords can be inserted through the aligned openings into the hole formed by the ring and hole in the insulating member without the necessity of threading the ends of the wiper cords through the hole. The slidable ring has turned over edges forming a groove about its periphery which fits over the inside edge of the hole in the insulating member and permits manual slidable movement of the ring in the hole of the insulating member. The ring may, therefore, be manually rotated to any desired position where it remains until again manually moved. In order to insert the wiper cords in the hole the ring is manually rotated until the two openings are aligned after which the wiper cords are inserted through the aligned openings into the hole of the cord holder. After all the wiper cords are in the hole of the cord holder the ring may be manually rotated to close the opening thereby completing a circular hole to retain the wiper cords therein. This arrangement permits replacing wiper cords and wiper assemblies with considerable saving in time thus expediting the return to service of automatic switches which are temporarily out of commission, thus increasing the usability of said switches and a general improvement of the service through the telephone exchange, of which the said switches form a part.

A complete understanding of the device and the utility thereof will be apparent from a perusal of the following explanation and appended claims, and by reference to the appended drawing, wherein;

Figure 1 shows an elevation view of a wiper assembly embodying a cord guide of this invention.

Figures 2 and 3 show top views of the slotted ring and slotted cord guide of this invention respectively.

Figure 4 is an enlarged perspective view of a portion of one end of the cord guide including the rotatable metal ring.

Figure 5 shows an exploded view of a wiper spring assembly including a cord guide provided with its slotted metal ring.

Referring now to the drawing, Figure 1 is a side view of the well known type of wiper assembly used in automatic telephone systems, being provided with a cord guide 15 of this invention equipped with a suitable slotted ring, or eyelet, 17. It will be seen by reference to Figure 5 that the wiper assembly of Figure 1 comprises a metallic hub 10 having a knurled shoulder 41 and collar 42. A washer 43 and bushing 45 of insulating material disposed on shoulder 41 and around collar 42 insulates wiper springs 14 and 16 from hub 10; insulators 13 and 23 insulate wiper springs 14 and 16 from each other while at the same time provides the required degree of separation between the tips thereof for proper engagement with bank contacts (not shown). An insulated cord guide 15 of this invention having a slot 31, an eyelet 17, which also has a slot, or opening, such as 20, insulates the wiper 16 from metallic washer 18. The above described details are assembled into a compact arrangement in the order shown and are clamped together by flaring the bottom portion 9 (seen in Figure 1) of the collar 42 over the hub 10 and also the top end 19 (of collar 42) over washer 18.

The above described wiper spring assembly as shown in Figure 1 is installed upon the shaft of a switch, either one or more as required, properly aligned and secured thereto by any suitable means, such as set screw 11. In certain combinations the wiper springs 14 and 16 are connected together to serve as one conductor in a circuit. However, in most instances each wiper spring such as 14, serves as a separate conductor and each wiper must be provided with a wiper cord (not shown) to complete the electrical circuit. When two or more wiper assemblies are mounted on one shaft, one assembly above the other, the cord guides, such as 15, serve to confine the cords into a neat cable-like lead from the uppermost wiper assembly to one or more other wiper assemblies, fixed at lower positions on the shaft, while at the same time confining the cords to a position where the same cannot become entangled with the movable shaft or the wipers. In earlier art the wiper cords for the top wiper assembly passed through a hole in a cord guide of one or more wiper assemblies below the top assembly. Therefore when it became necessary to remove and replace one of the wiper assemblies below the top assembly, the cords leading to the top assembly were disconnected and threaded back through one or more cord fasteners and after the new wiper assembly had been replaced and its cords reconnected, there was still the extra work of rethreading the cords for the higher assemblies and re-soldering same in correct position.

The cord guide of this invention eliminates considerable expense in replacing cords on automatic telephone switches, it also enables the maintenance personnel to shorten the out-of-service period of time by returning the faulty switch to service at the earliest possible moment, thus adding many hours of useful service which relieves congestion in certain parts of the exchange system.

To accomplish this a cord holder, or guide, 15 made of insulating material is provided with a slot or opening 31, through which a cord or wire can be passed to the holder enclosure without threading the end of the cord through a hole, thereby making it unnecessary to unsolder the cord ends from their terminal on the wiper spring on the same or higher levels. The slot 31 in the cord guide, such as 15, is closed by rotating the slotted ring 17. At any time the ring 17 can be rotated to a position where its slot 20 comes into alignment with the slot 31 in the guide 15 whereby a cord or cords may be removed and/or replaced with ease and dispatch resulting in a considerable saving in time for both the work of repair and the time an expensive switch is out of service which is very important in a busy telephone exchange. As will be seen in Figure 4, the ring 17 has turned over edges forming a groove about its periphery. This groove acts as a guide with the hole in the guide 15 to permit manual rotation of ring 17 within the hole so as to align the two openings 31 and 20 when desired, or to completely close the opening 31 when the ring 17 is manually rotated to a position where the ring opening 20 is diametrically opposite the opening 31 in guide 15. The ring 17 has sufficient tension against the guide 15 to retain the ring in any set position and still permit manual rotation thereof to any desired position.

What is claimed is:

1. In a wiper assembly for a switch shaft for attaching a cord to each wiper in said assembly, a cord guide fixedly secured in said assembly, a hole in said guide for retaining the wiper cords, an opening through said guide to said hole, a guide ring, an opening in said ring, said guide ring rotatably mounted in said hole and manually rotatable to align said openings to permit the wiper cords to be passed through said aligned openings into said hole after which said guide ring may be manually rotated to unalign said openings thereby completely closing said hole to retain the wiper cords therein without removing any portion of said assembly.

2. In a wiper assembly for a switch shaft having a wire supporting and holding device fixedly secured in said assembly and comprising a base member and a ring or collar member, a hole in said base member for enclosing a plurality of wires for the support of said wires, said ring or collar member rotatably fixed in said hole in said base member, a slot in said base member communicating from the outside of said base member to the said hole in said base member, a slot in said ring or collar member, said ring or collar member manually rotated to cause the said slot in said ring to stop in alignment with said slot in said base member whereby a passageway is formed for the entrance or exit of a wire or wires without the necessity of threading either end of said wire or wires through the hole in said base member or said ring member and without removing any portion of said assembly.

3. In a wiper assembly for a switch shaft including an elongated cord holding member fixedly secured to said wiper assembly at one end and having a hole for wiper cords at the other end, a retaining ring having turned over edges forming a groove around its periphery and rotatably mounted in said hole in said cord holding member with the groove and turned over edges acting as a guide within the inner circumference of said hole, an opening in said cord holding member extending from the outside of said member into said hole, and an opening in said retaining ring manually rotatable for cooperation with said opening in said member to permit passage of the wiper cords through said aligned openings and manually rotatable to completely close said hole to retain said wiper cords therein without removing any portion of said assembly.

BERTRAM H. SHOOPMAN.

REFERENCES CITED

The following references are of record in the file of this patent:

UNITED STATES PATENTS

| Number | Name | Date |
|---|---|---|
| 99,891 | Hattersley | Feb. 15, 1870 |
| 338,268 | Henry | Mar. 23, 1886 |
| 2,206,052 | Schoeninger | July 2, 1940 |
| 2,259,103 | Drake | Oct. 14, 1941 |
| 2,318,383 | Drake | May 4, 1943 |
| 2,457,588 | Miller | Dec. 28, 1948 |

FOREIGN PATENTS

| Number | Country | Date |
|---|---|---|
| 241,150 | Germany | Feb. 17, 1911 |